Sept. 26, 1950  F. G. L. BECKER  2,523,642
FIBROUS PULP DIGESTER
Filed Jan. 12, 1944  5 Sheets-Sheet 1
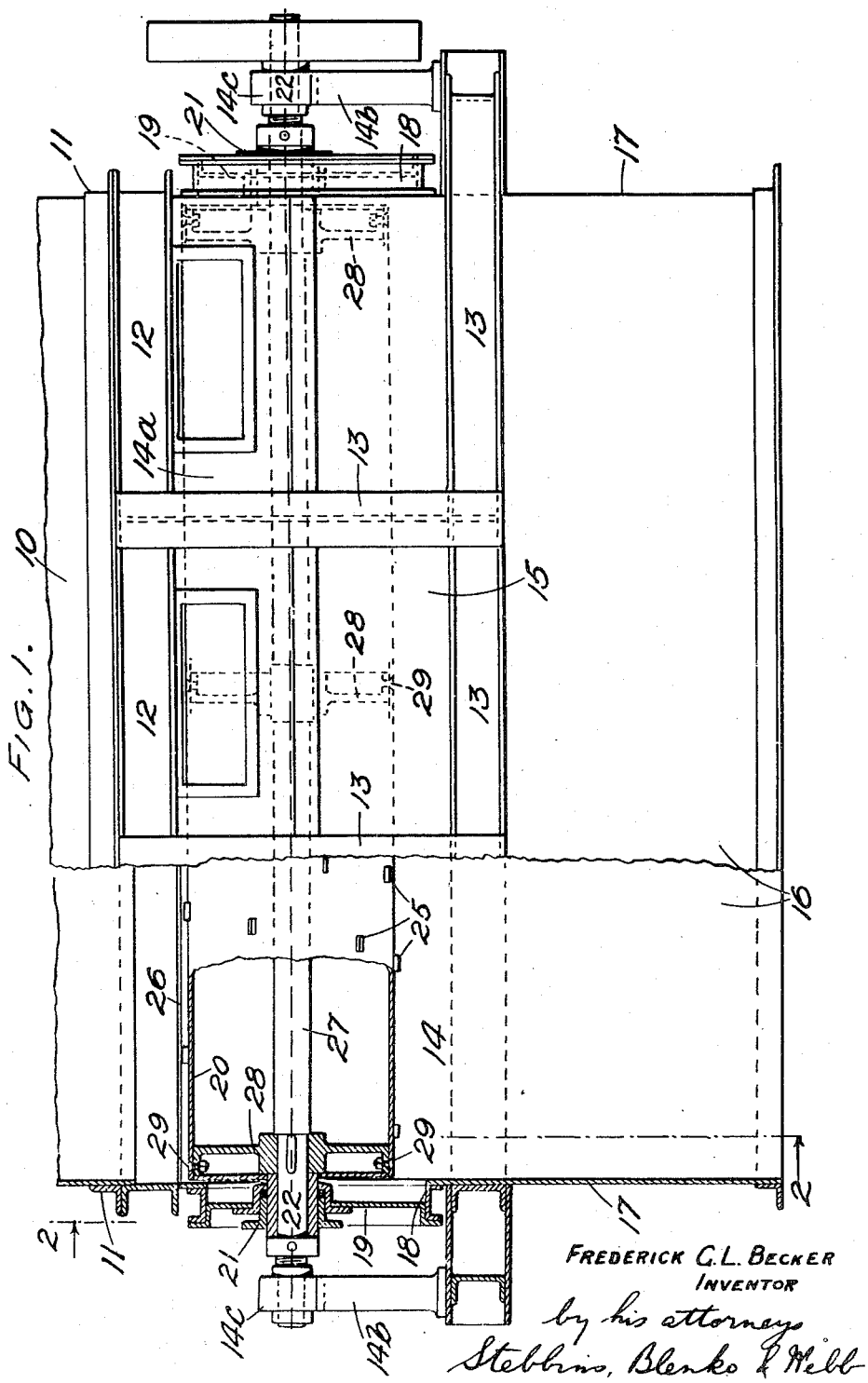
FREDERICK G. L. BECKER
INVENTOR
by his attorneys
Stebbins, Blenko & Webb

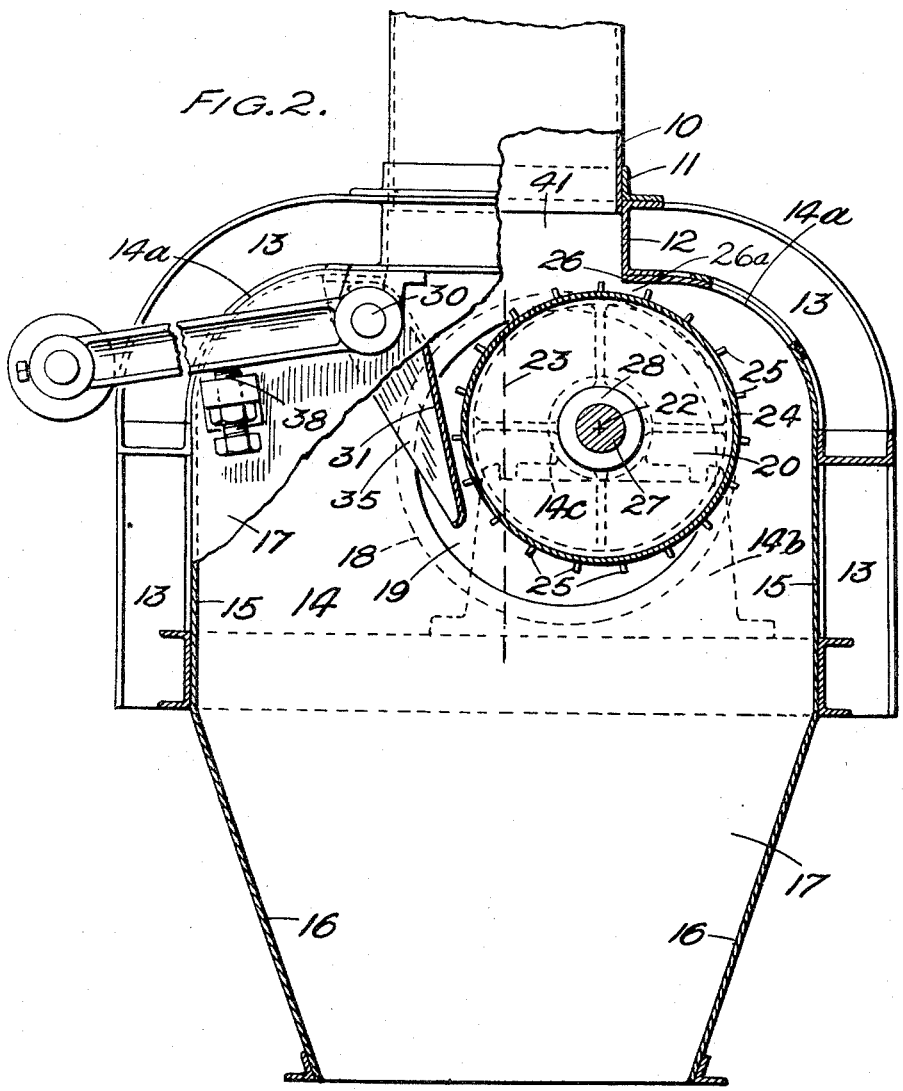

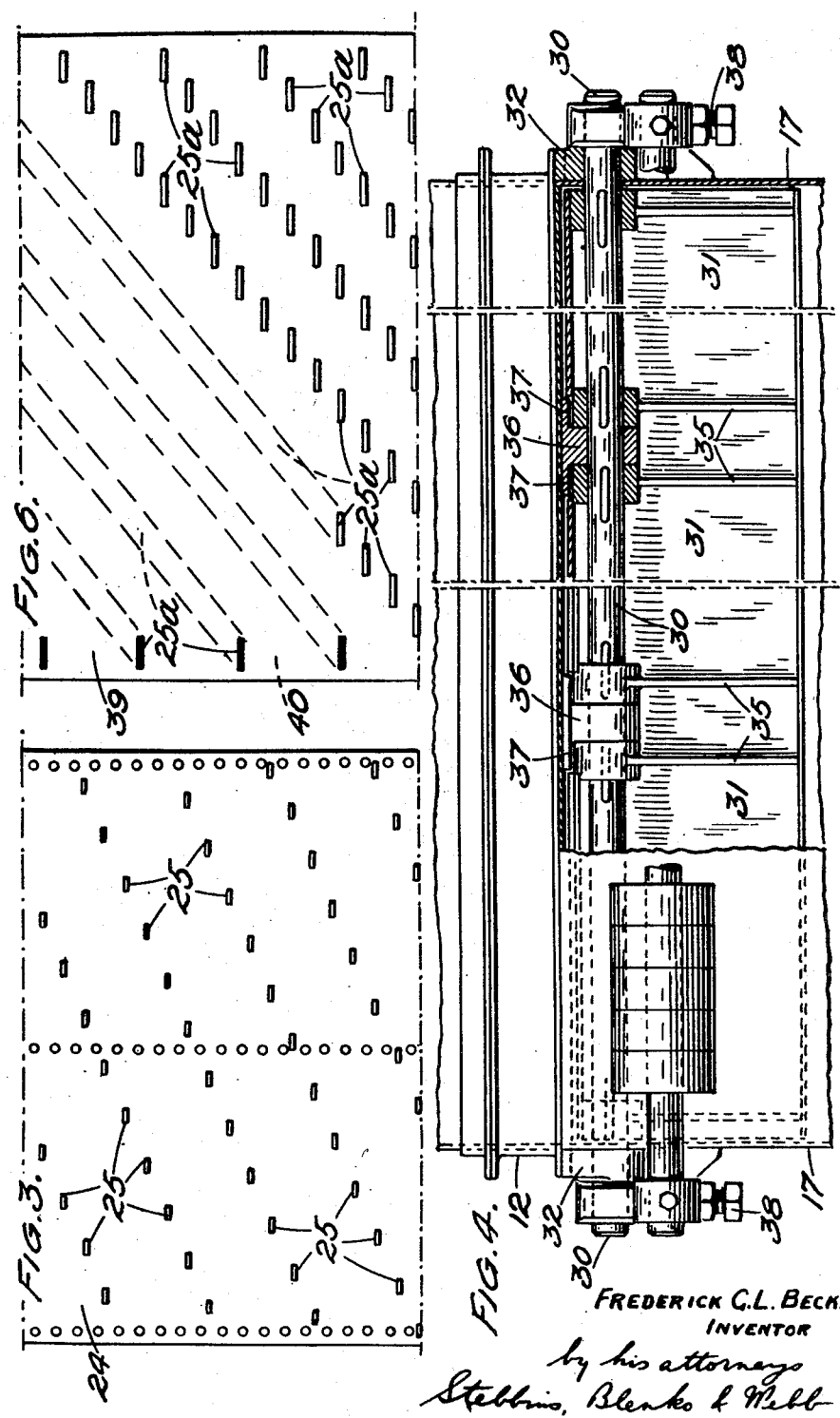

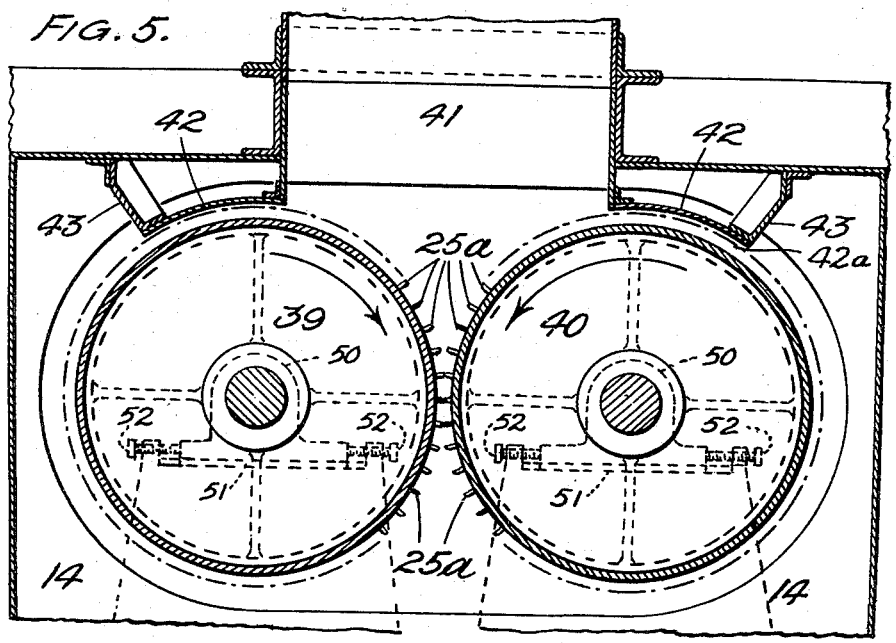
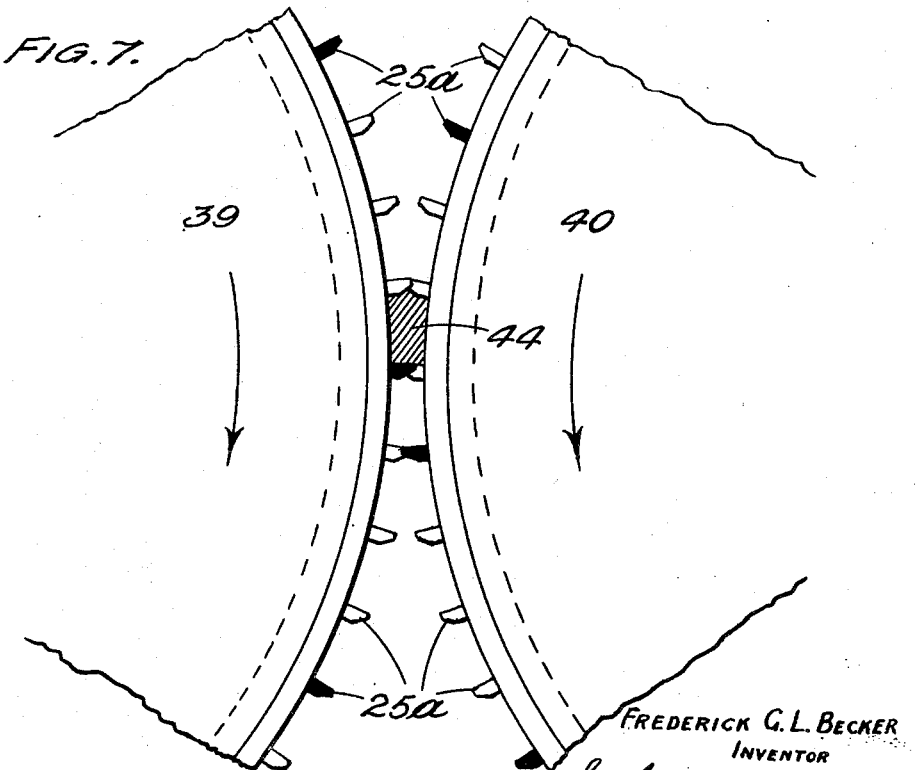

Sept. 26, 1950 — F. G. L. BECKER — 2,523,642
FIBROUS PULP DIGESTER
Filed Jan. 12, 1944 — 5 Sheets-Sheet 5
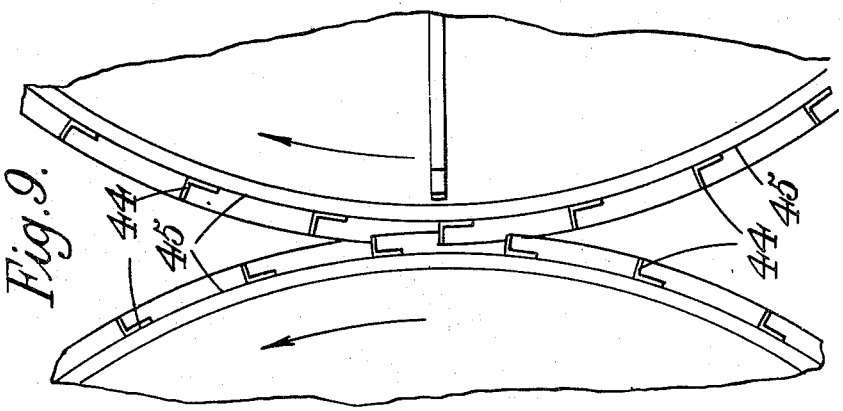
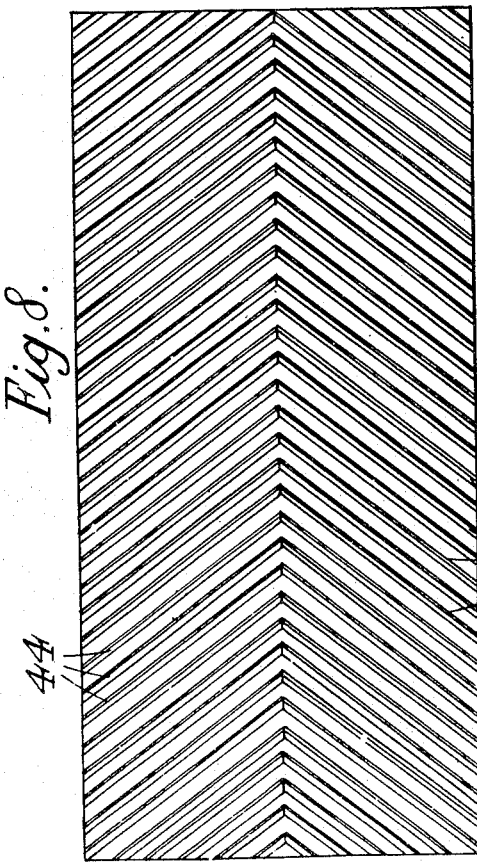
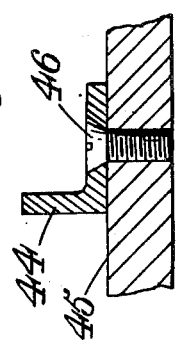
Inventor
Fredrick G. L. Becker Patented Sept. 26, 1950

2,523,642

UNITED STATES PATENT OFFICE 2,523,642

FIBROUS PULP DIGESTER

Frederick George Lucas Becker, Hatch End, England, assignor to Cellulose Development Corporation Limited, Hatch End, England, a British company Application January 12, 1944, Serial No. 517,932
In Great Britain September 9, 1942

Section 1, Public Law 690, August 8, 1946
Patent expires September 9, 1962

5 Claims. (Cl. 92—7)

This invention relates to chemical reaction towers of the kind wherein there is a continuous gravitation of the material from the top to ь bottom of the tower, during which time the reaction is carried out and wherein the material is mechanically extracted from the bottom of the tower at a predetermined rate.

The invention is particularly applicable to reaction towers in which the reaction is required to take place under pressure, as for example in reaction towers used for the predigestion of vegetable material in the manufacture of paper pulp. A problem arises of how to permit the optimum ratio of reacting liquid and material to be employed without the mixture, and particularly without the liquid, being forced out of the bottom of the tower past the mechanical extracting device at too quick a rate. Attempts have been made to overcome this difficulty by using less liquid than the optimum amount required, whereby a more compact mass is formed in the reaction tower which is less likely to be forced out by the pressure upon the extracting device. This, however, has led to other complications, particularly in the case where the preheating of the mass was effected by injecting steam into it. In this instance it was found necessary to employ a tower of flattened or oval cross-section and to inject the steam across the narrow dimension of the cross-section in order that the mass might be evenly permeated.

According to the present invention, a chemical reaction tower of the kind first referred to above, is provided at its lower end with an extraction device comprising a rotatable drum with shallow teeth or the like, which drum is so disposed in a surrounding casing that a moving face thereof is exposed to the contents of the tower, the depth of which teeth and the spacing between the drum and the casing is so selected as to prevent the passage of the required ratio of liquids and solids from the casing except in the direction of movement of the drum by the action of the moving teeth.

In one arrangement, two toothed rotatable drums are arranged opposite an opening in the bottom of the tower with their axes of rotation parallel, which opening may be flanked by surfaces arranged in close proximity to extremities of the teeth on the upper sides of said drum and which teeth on the two drums are arranged so as to clear one another during rotation, and so that the tips of the teeth on one drum approach closely the surface of the other drum at the zone of minimum separation.

Each drum may be provided with a number of circumferential rows of teeth, the teeth in adjacent rows being staggered. Preferably the staggering is such as to provide a number of helically disposed rows.

The circumferential rows on the two drums are arranged opposite one another and the two drums are so driven that the teeth in any one row on one drum are in advance of the teeth in the corresponding row of the other drum.

The extent of angular advance of one drum in relation to the other corresponds to the pitch of staggering between adjacent rows of teeth on a drum.

In the case where a drum is provided with a number of bars instead of teeth these bars may be about ⅜" thick and projecting about ¾" height from the surface of the drum and extending along its length, but in this case more power will be required to turn the drum, particularly when starting the plant when the tower is full of heavy digested pulp.

It is found with the above arrangements, in the case of digesting straw for the manufacture of paper pulp, the ratio of liquid to material may be increased from the usual ratio of 3:1 to a ratio 6:1. Furthermore, it is no longer necessary to employ towers of flattened or oval cross-section, and cylindrical towers may be employed, which are cheaper and simpler to erect. Owing to a larger proportion of liquid being employed, the rate of digestion is increased and digestion is more uniform, since the liquid can circulate freely throughout the raw material being digested, instead of relying on the circulation of hot steam alone.

The following is a description of the invention applied to a reaction tower having a flattened or oval cross-section, reference being made to the accompanying drawings in which—

Figure 1 is an outside elevation partly in section showing the extractor chamber at the bottom of the tower;

Figure 2 is a section on the line 2—2 of Figure 1 but showing a part of an end wall of the chamber in elevation and one of the scraper-blade counterbalance levers;

Figure 3 is a development of the drum showing the positions of the teeth;

Figure 4 is a side elevation of the scraper-blade mounting showing certain parts in section;

Figure 5 is a section through the bottom of the tower showing a double drum extractor mechanism;

Figure 6 is a development of one of the drums; and

Figure 7 is an enlarged view of part of Figure 5 showing adjacent portions of the two drums.

Figure 8 shows a development of a drum provided with helical bars instead of teeth, Figure 9 is a side elevation of a part of the two drums provided with helical bars, and Figure 10 is a section through one bar showing the means for attaching it to a drum.

The tower 10 is supported by a flange 11 at its bottom on a channel member 12 forming a part of a framework 13 for an extractor chamber 14 in which the extractor drum is rotatably mounted. The opening at the top of the extractor chamber which registers with the opening at the bottom of the tower, may, for example, be about 21½ inches in width and 10 feet and ⅞ of an inch in length. The walls of the chamber extending outwardly from the long sides of this opening are part cylindrical as indicated at 14a and join upright walls 15 which at their bottom converge together at 16 to form a discharge chute. The end walls 17 of the chamber are flat and are reinforced by channel rings 18 formed with circular openings in which are secured plates 19 which carry glands 21 for the shaft of the extractor drum 20. The removal of these plates permits the drum to be withdrawn from the chamber. The shaft is mounted at each end on brackets 14b, and the bearings 14c are so arranged that the axis of rotation 22 of the drum is located about 9 inches to one side of a vertical plane 23 passing through the centre of the aforesaid opening. The drum comprises a cylindrical steel shell 24, ½ of an inch thick and 25¼ inches external diameter, from which project a number of teeth 25 ¾ of an inch in height. The aforesaid bearings of the drum are so located that a spacing 26a or clearance of $\frac{1}{16}$ of an inch is provided between the tips of the teeth and the lower edge 26 of the long side of the opening at the top of the chamber. There are some 48 teeth, the width of each of which in a direction along the axis of the drum is 2 and $\frac{1}{16}$ inches and which are ⅜ of an inch thick. These teeth are welded to the shell. The number of teeth may be increased or decreased in accordance with the rate of extraction desired but are so arranged that on any one circumference there is at least one tooth, and as will be seen from Figure 3 there are no portions on the drum on which a circumference can be drawn without intersecting at least one tooth. As viewed from the end of the drum, in a typical instance, the pitch of the teeth is such as to provide 19 around the circumference. The shell is supported on a four-inch diameter shaft 27 by three flanged discs 28 keyed to the shaft. The shell is secured to the flanges of the discs by means of countersunk headed bolts 29. Mounted also between the end plates of the chamber is a cross-shaft 30, the axis of which is disposed 12½ inches on the opposite side of the central plane to the axis of the extractor drum. The cross-shaft has secured to it a downwardly extending scraper-blade 31, the lower extremity of which is arranged tangentially to the drum. The cross-shaft is mounted in bearings 32 in the end plates and has secured to it on the outside of the chamber at its end two laterally-extending lever arms, between which is located a loading rod. The loading rod is detachable from said lever arms so as to receive one or more loading weights. The cross-shaft has keyed to it a number of bosses to which are secured outwardly extending rib plates 35 to which the scraper-blade is welded. The cross-shaft is additionally supported by bearings 36 which are disposed between adjacent bosses carrying the aforesaid plate ribs, which bearings are provided with flanges 37 for attachment to the upper wall of the chamber. Suitable stops 38 are provided on the outside of the end walls for engaging the laterally-extending lever arms whereby the scraper-blade is spaced the required distance from the tips of the teeth. Instead of the lever arms and weights, other means, such as a screw regulator can, if desired, be provided for adjusting the scraper. The present invention, however, is not concerned with this movable scraper blade but with the spacing of the drum surface and of the tips of the teeth from the surrounding surfaces at the bottom of the tower. For the purposes of this invention the scraper blade might be fixed so long as the aforesaid spacing was such that the material in the tower can only pass out in the direction of the movement of the drum surface.

The above mechanism can be used with single or multiple towers of circular cross-section by providing a suitably shaped chute or chamber from the bases of the tubular towers to the opening of the extractor chamber. The area of the cross-section of such chute or chamber must be not less, and preferably somewhat greater, than the combined cross-section of the towers, thus avoiding any tendency for the material to become wedged in the said chute or chamber.

Alternatively, the base of the tubular towers can be extended to give a clearance of only about $\frac{1}{16}''$ from the teeth or blades of the extractor drum, the ends of the towers in this case being suitably shaped to conform to the cylindrical surface of the drum. The ends of the towers in this case are enclosed, together with the extractor drum, in the extractor chamber.

The towers are displaced in relationship to the axis of the extractor drum and the scraper arrangement is employed as above described. Alternatively, if the diameter of the towers does not exceed that of the extractor drum, and if the towers are symmetrically placed over the drum, the scraper-blade may be dispensed with, but in this case means are preferably provided for adjusting the clearance between the shaped ends of the towers and the extractor drum teeth.

It has been found that where rapidity and accuracy of the extraction is of prime importance, in conjunction with a requirement of high liquid to solid ratio of the charge in the tower, this may be obtained by the two-drum arrangement shown in Figures 5, 6 and 7.

In such an arrangement, the two toothed drums 39 and 40 are arranged side by side beneath the opening 41 at the bottom of the tower and with their axes parallel. The bearings for the spindles of the drum are adjustable towards and away from one another. Such adjustment may be provided by mounting the bearing members 50 in a keyway 51 and holding them in position by means of jam screws 52 or other suitable means. The opening 41 is flanked by surfaces 42 which are arranged in close proximity to the teeth 25a at the tops of the drums and separated from the drums by a spacing 42a, which surfaces are carried by bracket arms 43 attached to the walls of the extractor chamber 14. These surfaces prevent the charge in the bottom of the tower forcing its way past the two drums in direction opposite to the rotation thereof.

With particularly hard pulps such as partially digested straw, if the drums are rotated inwardly so that the exposed surfaces move downwardly the material tends to become wedged between the two drums. In such cases, arrangement is made for reversing the direction of rotation of the drums, thus obtaining a regular and controlled discharge from the two outside surfaces of the drums. This direction of rotation also facilitates the use of barred drums as the squeezing action between the drums is eliminated, and in this case an almost perfect seal can be obtained by arranging minimum clearance between the edges of the bars on one drum and the surface of the other drum. When the drums rotate outwardly the aforesaid surfaces flanking the opening in the towers may be dispensed with.

It is found with the above arrangement, in the case of digesting fibrous material for the manufacture of paper pulp, that the ratio of liquid to material may be increased from the usual ratio of 3:1 to a ratio of 6:1 or even 10:1. Furthermore, it is no longer necessary to employ towers of flattened or oval cross-section, and cylindrical towers may be employed, which are cheaper and simpler to erect. Owing to large proportion of liquid being employed, the rate of digestion is increased, and digestion is more uniform, since the liquid can circulate more freely throughout the raw material being digested, instead of relying on the circulation of the steam alone. Spray pipes (not shown) may be disposed in the corners of the casing close to one side of each drum.

As will be seen from Figure 6, a greater number of teeth 25a are arranged both across the axial width of the drum and around the circumference than in the first arrangement.

As will be seen from Figures 5 and 7, the teeth in each outer circumferential row are shown black, and it will be noted that the teeth in the outer circumferential row of the drum 40 are arranged in advance of the corresponding circumferential end row of the drum 39 by an amount corresponding to the pitch of staggering in adjacent rows.

The portion of the material dragged by the teeth and compressed in the zone of minimum distance between the drums, forms a seal, preventing the liquid from falling through, and the surfaces 42 have the purpose of making a seal on the top part of the drums as referred to above, so that there is no unwanted or uncontrolled discharge from the tower, no matter how high the liquid solid ratio may be.

The amount of material extracted during the rotation of the drums is proportional to the volume of the spaces shown shaded at 44, enclosed between the teeth and the surface of the drums and, consequently, the digested pulp is discharged at an even and predetermined rate in relationship to the speed of rotation of the drums.

As indicated above, the teeth may be replaced by bars which extend axially across the drums and may be of helical shape as shown in Figures 8 to 10, the bars are formed from lengths of angle iron 44, each of which is bent into helical form so that one of the flanges contacts with the surface 45 (Figure 9) of the drum to which it is secured by a number of set screws 46 (Figure 10). As will be seen from Figure 8, two sets of bars are provided, the bars of one set being arranged at an angle to the other.

It is found in pre-digesting material for the manufacture of paper pulp employing a ratio of liquid to material of 6:1, that the clearance spaces between the surface of the drum and the scraper-blade may be about $\tfrac{1}{8}$ of an inch, the teeth projecting beyond the drum by about ¾ of an inch and a clearance space of about $\tfrac{1}{8}$ of an inch being arranged between their tips and the scraper-blade, and also between the walls flanking the opening in the bottom of the tower. The clearance may be adjusted according to the type of the fibrous material being digested and to the ratio of liquid present.

It will be appreciated that the raw material in the tower is subjected to a gradually increasing hydraulic pressure as it descends through the tower, depending upon the height of the tower. For example, with a tower 60 feet in height the material is in effect being cooked under pressure which increases up to 30 pounds per square inch at the bottom.

This increase in pressure, with the consequent increase in temperature, is an important factor in the chemical reaction taking place in the tower.

Heretofore, when the usual form of spiked shaft extractor is employed, the height of a tower for straw digestion in the manufacture of paper pulp cannot be much more than 30 feet, and if caustic soda solution at the concentration of about 2% were introduced with the straw at the top of this low tower, it would be found that the black liquor discharged from the bottom of the tower would have a residual alkalinity of say, 0.4% to 0.5% in terms of free caustic soda. With the use of the form of extractor according to the present invention, higher towers can be employed, say, for example, 60 feet in height; then, owing to the increase in temperature of the bottom part of the tower, when using the same concentration of caustic soda solution as set out above, the reaction between the alkaline liquor and the partly digested straw is increased, and the residual alkalinity of the black liquid discharged would be as low as 0.1% or 0.2%. The practical result is that the same degree of digestion can be achieved with the use of a smaller quantity of caustic soda in the higher tower as with a larger quantity of caustic soda in the shorter tower.

I claim:

1. Extraction means for a continuous digesting tower for the manufacture of pulp from fibrous material comprising two toothed rotatable drums arranged in an opening at the bottom of the tower with their axes parallel, a casing surrounding the drum, which teeth are arranged in circumferential rows so that the rows on one drum are opposite the rows on the other drum but so that the teeth on one drum are in advance of the teeth on the other, which teeth are so arranged that the tips thereof on one drum approach closely the surface on the other drum at the zone of minimum separation, the depth of which teeth and the spacing between the drum and the casing being selected to prevent the passage of the required ratio of liquids and solids from the casing except in the direction of movement of the drum by the action of the moving teeth, said casing being formed to provide an unobstructed passage below said zone thereby providing for free fall of the solids.

2. Extraction means for a continuous digesting tower for the manufacture of pulp from fibrous material comprising two toothed rotatable drums arranged in an opening at the bottom of the tower with their axes parallel, a casing surrounding the drums, which teeth are arranged in circumferential rows so that teeth in adjacent rows are staggered and so that the rows on one drum are opposite the rows on the other drum but with the teeth on one in advance of the other by an amount corresponding to said stagger which teeth are so arranged that the tips thereof on one drum approach closely the surface on the other drum at the zone of minimum separation, the depth of which teeth and the spacing between the drum and the casing being selected to prevent the passage of the required ratio of liquids and solids from the casing except in the direction of movement of the drum by the action of the moving teeth, said casing being formed to provide an unobstructed passage below said zone thereby providing for free fall of the solids.

3. Extraction means for a continuous pressure digesting tower for the manufacture of pulp from fibrous materials, comprising two toothed rotatable drums arranged in an opening at the bottom of the tower with their axes parallel, a casing surrounding the drums, edge members having surfaces flanking said opening and extending partly around the circumference of each drum in close proximities to the extremities of the teeth thereon, which teeth on the drum are arranged so as to clear one another during rotation and so that the tips of the teeth on one drum approach closely the surface of the other drum at the zone of minimum space, said teeth being so placed that there are no portions on the drum on which a circumference can be drawn without intersecting at least one tooth, the depth of which teeth and the spacing between the drum and the casing being selected to prevent the passage of the required ratio of liquids and solids from the casing except in the direction of movement of the drum by the action of the moving teeth, the said casing being formed to provide an unobstructed passage below said zone thereby providing for free fall of the solids and means for rotating the drums in either direction according to the nature of the material being treated.

4. Extraction means for a continuous pressure digesting tower for the manufacture of pulp from fibrous material comprising a rotatable drum arranged in an opening at the bottom of the tower, a casing partially surrounding the drum, a number of circumferential rows of teeth on said drum, the teeth in adjacent rows being staggered, said teeth being arranged on the drum so that there are no portions on the drum on which a circumference can be drawn without intersecting at least one tooth the depth of which teeth and the spacing between the drum and the casing being selected to prevent the passage of the required ratio of liquids and solids from the casing except in the direction of movement of the drum by the action of the moving teeth, said casing being formed to provide an unobstructed passage below said zone thereby providing for free fall of the solids.

5. Extraction means for a continuous pressure digesting tower for the manufacture of pulp from fibrous material comprising two toothed rotatable drums arranged in an opening at the bottom of the tower with their axes parallel, a casing surrounding the drums, which teeth on the drums are arranged so as to clear one another during rotation and so that the tips of the teeth of one drum approach closely the surface of the other drum at the zone of minimum separation, said teeth being arranged on the drum so that there are no portions on the drum on which a circumference can be drawn without intersecting at least one tooth the depth of which teeth and the spacing between the drum and the casing being selected to prevent the passage of the required ratio of liquids and solids from the casing except in the direction of movement of the drum by the action of the moving teeth, said casing being formed to provide an unobstructed passage below said zone thereby providing for free fall of the solids, and means for adjusting the distance between the two drums.

FREDERICK GEORGE LUCAS BECKER.

REFERENCES CITED

The following references are of record in the file of this patent:

UNITED STATES PATENTS

| Number | Name | Date |
|---|---|---|
| 38,698 | Rutledge | May 26, 1863 |
| 251,226 | Hart | Dec. 20, 1881 |
| 314,652 | Clark | Mar. 31, 1885 |
| 365,429 | Browne | June 28, 1887 |
| 574,882 | Cooper | Jan. 12, 1897 |
| 770,111 | Reece | Sept. 13, 1904 |
| 1,233,514 | Scott | July 17, 1917 |
| 1,369,968 | Draver | Mar. 1, 1921 |
| 1,515,181 | Toomey | Nov. 11, 1924 |
| 1,560,313 | Pittman | Nov. 3, 1925 |
| 1,723,229 | Coffin | Aug. 6, 1929 |
| 1,777,661 | Dellenberger | Oct. 7, 1930 |
| 1,970,148 | Pomilio | Aug. 14, 1934 |
| 2,011,799 | De La Roza | Aug. 20, 1935 |
| 2,028,419 | Sperry | Jan. 21, 1936 |

FOREIGN PATENTS

| Number | Country | Date |
|---|---|---|
| 113,466 | Germany | Sept. 21, 1900 |
| 593,533 | Germany | Sept. 17, 1935 |
| 9,633 | Great Britain | of 1843 |